United States Patent
Sultana et al.

(10) Patent No.: US 10,248,424 B2
(45) Date of Patent: Apr. 2, 2019

(54) CONTROL FLOW INTEGRITY

(71) Applicants: Salmin Sultana, Hillsboro, OR (US); Stanislav Bratanov, Nizhniy Novgorod (RU); David M. Durham, Beaverton, OR (US); Beeman C. Strong, Portland, OR (US)

(72) Inventors: Salmin Sultana, Hillsboro, OR (US); Stanislav Bratanov, Nizhniy Novgorod (RU); David M. Durham, Beaverton, OR (US); Beeman C. Strong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/283,370

(22) Filed: Oct. 1, 2016

(65) Prior Publication Data

US 2018/0095764 A1    Apr. 5, 2018

(51) Int. Cl.
*G06F 9/44* (2018.01)
*G06F 9/38* (2018.01)
(Continued)

(52) U.S. Cl.
CPC .......... *G06F 9/3806* (2013.01); *G06F 9/3016* (2013.01); *G06F 11/3636* (2013.01); *G06F 11/3648* (2013.01)

(58) Field of Classification Search
CPC .. G06F 9/3016; G06F 9/3806; G06F 11/3648; G06F 11/3636
(Continued)

(56) References Cited

U.S. PATENT DOCUMENTS 8,782,435 B1 * 7/2014 Ghose ................. G06F 9/3851
                                                        711/118
9,262,163 B2    2/2016 Kurts et al.
(Continued)

FOREIGN PATENT DOCUMENTS

WO    2009-156198 A1    12/2009

OTHER PUBLICATIONS

Kruegel et al., "Static Disassembly of Obfuscated Binaries", Aug. 2004, The USENIX Association, 16 pages.*
(Continued)

*Primary Examiner* — Ted T. Vo
(74) *Attorney, Agent, or Firm* — Grossman, Tucker, Perreault & Pfleger, PLLC

(57) ABSTRACT

One embodiment provides an apparatus. The apparatus includes collector circuitry to capture processor trace (PT) data from a PT driver. The PT data includes a first target instruction pointer (TIP) packet including a first runtime target address of an indirect branch instruction of an executing target application. The apparatus further includes decoder circuitry to extract the first TIP packet from the PT data and to decode the first TIP packet to yield the first runtime target address. The apparatus further includes control flow validator circuitry to determine whether a control flow transfer to the first runtime target address corresponds to a control flow violation based, at least in part, on a control flow graph (CFG). The CFG including a plurality of nodes, each node including a start address of a first basic block, an end address of the first basic block and a next possible address of a second basic block or a not found tag.

21 Claims, 3 Drawing Sheets

(51) Int. Cl.
*G06F 11/36* (2006.01)
*G06F 9/30* (2018.01)

(58) Field of Classification Search
USPC .......................................... 717/126, 131–133
See application file for complete search history.

(56) References Cited

U.S. PATENT DOCUMENTS

| | | | | |
|---|---|---|---|---|
| 9,569,613 | B2* | 2/2017 | Yamada | G06F 21/54 |
| 2008/0034350 | A1* | 2/2008 | Conti | G06F 21/54 |
| | | | | 717/124 |
| 2013/0024676 | A1* | 1/2013 | Glew | G06F 9/30076 |
| | | | | 712/244 |
| 2013/0055221 | A1 | 2/2013 | Murthy et al. | |
| 2015/0095878 | A1 | 4/2015 | Zhang et al. | |
| 2015/0106604 | A1 | 4/2015 | Greathouse et al. | |
| 2016/0117171 | A1 | 4/2016 | Kurts et al. | |
| 2016/0283714 | A1 | 9/2016 | LeMay et al. | |
| 2018/0253574 | A1 | 9/2018 | Sultana | |

OTHER PUBLICATIONS

Abad et al., "On-Chip Control Flow Integrity Check for Real Time Embedded Systems", 2013, IEEE, pp. 26-31.*
Abadi et al., "Control-Flow Integrity Principles, Implementations, and Applications", 2009 ACM, 40 pages.*
Intel 64 and 1A-32 Architectures Software Developer's Manual, vol. 3 (3A, 3B, 3C and 3D), System Programming Guide, Jun. 2016, Chapter 36.
Unpublished U.S. Appl. No. 15/450,931, filed Mar. 6, 2017.
International Search Report and Written Opinion issued in PCT Application No. PCT/US2017/049499, dated Dec. 11, 2017, 11 pages.

* cited by examiner

CONTROL FLOW INTEGRITY

FIELD

The present disclosure relates to control flow, in particular to, control flow integrity.

BACKGROUND

Return oriented programming (ROP) and jump oriented programming (JOP) are each a form of control flow hijacking attack. These attacks leverage memory corruption bugs, e.g., buffer overflow, to redirect control flow to already existing executable code stored in memory. The attacks rely on short instruction sequences, called "gadgets", that end with an indirect branch instruction (e.g., return, jump*, call*, where *corresponds to indirect addressing) and perform attacker-chosen operations. Control flow integrity (CFI) validation techniques may provide a defense against control flow hijacking attacks. CFI validation techniques are configured to guarantee legitimate control flow transfers in an application. Existing CFI validation techniques may require source code modification and/or binary re-instrumentation to insert run time CFI checks in an application binary. Further, existing CFI validation techniques may incur a performance penalty and/or may provide only a limited history, thus, limiting accuracy.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
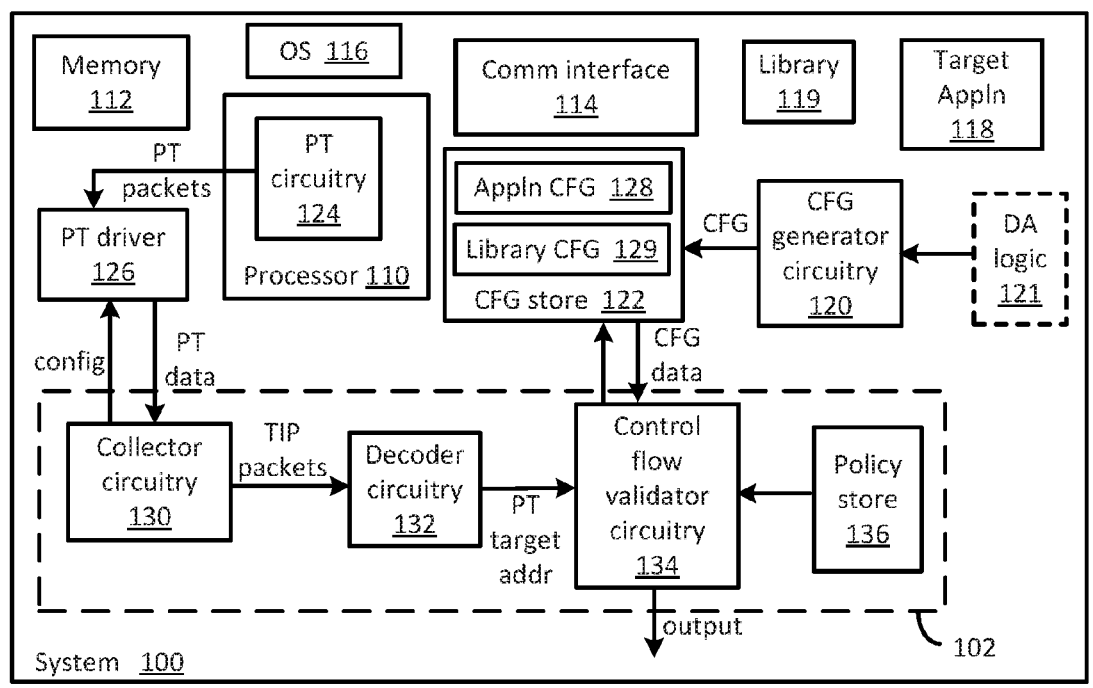
FIG. 1 illustrates a functional block diagram of a system that includes control flow integrity circuitry consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

An instruction trace tool (PT circuitry), e.g., Intel Processor Trace (PT) available from Intel Corp., may be configured to capture information (i.e., PT data) related to execution of a target application, a plurality of applications, selected memory ranges and/or an entire system. The PT data is collected in data packets and may include, e.g., timing information, program flow information (e.g., branch targets, branch taken/not taken indicators, function return addresses), etc. The data packets may be stored temporarily by the PT circuitry and may then be provided to memory and/or other storage for analysis. The PT data may then be utilized for control flow analysis operations, e.g., to reconstruct the program flow.

A control flow graph (CFG) is a representation, using graph notation, of control flow, i.e., execution, paths that may be traversed through an application during execution of the application. In a control flow graph, each node in the graph corresponds to a basic block. A basic block is a sequence of instructions where control enters only at the beginning of the sequence and control leaves only at the end of the sequence. There is no branching in or out in the middle of a basic block. For example, a destination address, may correspond to a start of a basic block and an indirect branch instruction may correspond to an end of the block. An address of the indirect branch instruction may correspond to a source address. A target address of the indirect branch instruction may correspond to a next possible address of a next basic block in the CFG, i.e., may correspond to a beginning address of a next/reachable basic block in the CFG. Edges between two basic blocks (e.g., a first block and a second block) represent control flow transfer from the end of the first block to the beginning of the second block. A node may thus include a start address of the basic block, an end address of the basic block and a next possible start address of a next basic block i.e., a beginning address of a next/reachable basic block. A control flow graph may be generated by, for example, source code analysis, binary analysis, static binary analysis, execution profiling, etc. The control flow graph may then include a plurality of legitimate execution paths. Each legitimate execution path may include a plurality of nodes connected by one or more edges.

Control flow integrity (CFI) validation techniques are configured to enforce a CFI security policy that execution of an application follow a legitimate path of a CFG. CFI validation techniques may thus be used to mitigate control flow hijack attacks. Generally, CFI validation is configured to validate a control flow transfer and/or an execution path at indirect or conditional branches, determined at runtime, against a legitimate CFG, determined prior to runtime. As used herein, indirect branch instructions include, but are not limited to, jump instructions, function calls, function returns, interrupts, etc., that involve updating the instruction pointer from a register or a memory location. Some CFI validation techniques rely on source code modification or binary re-instrumentation to insert run time CFI checks into the application binary.

CFI validation techniques may be categorized as coarse-grained or fine-grained. Generally, coarse-grained control flow integrity techniques are configured to validate only target (i.e., destination) addresses associated with indirect branch instructions. In other words, a path from a source address (i.e., that includes the source address) to the target destination address may not be checked. Fine-grained control flow integrity techniques are configured to validate the path between the source of an indirect branch instruction and the target address of the branch. Fine-grained control integrity techniques may also include validating an execution path between the target address of a preceding indirect branch instruction and the source address of a current indirect branch instruction. Coarse-grained control flow integrity techniques may be relatively easier to implement but may not detect all control flow attacks. Fine-grained control flow integrity techniques may generally detect most control flow attacks but may be relatively more difficult to implement and/or may result in a performance penalty.

A target address of an indirect branch instruction may be identifiable or unidentifiable. An identifiable target address may be determined from the application binary (i.e., application binary code), prior to runtime. An unidentifiable target address may not be identified prior to runtime. An identifiable target address may be uniquely identifiable or may not be uniquely identifiable. A uniquely identifiable target address corresponds to a branch instruction with one next possible address. Thus, a next possible address for a selected node may correspond to the one next possible address of a next basic block. An identifiable target address that is not uniquely identifiable corresponds to a plurality of identified next possible addresses that may be identified prior to runtime, e.g., during static analysis, as described herein. Thus, a target address of an indirect branch instruction of a selected node may correspond to any one of a set of next possible addresses. Thus, each node included in a CFG may include a next possible address of a next basic block or a not found tag.

Generally, this disclosure relates to control flow integrity (CFI). An apparatus, method and/or system are configured to utilize processor trace (PT) data captured from PT circuitry and a control flow graph (CFG) to determine whether a control flow violation exists in an executing target application, in real time. PT circuitry and PT data are configured to provide runtime control flow information (i.e., an execution trace) that may then be utilized to enforce control flow integrity. Control flow integrity utilizing the execution trace is configured to detect malware that may be relatively more difficult to detect using logic-based techniques. The CFG may be determined during preprocessing operations, e.g., static analysis, prior to execution of the target application and/or may be updated during benign execution (i.e., training) of the target application, e.g., dynamic analysis.

The apparatus, method and/or system are configured to detect control flow integrity violations in real time, e.g., prior to launch of a malicious application. At least initially, attacker gadgets may be relatively benign, providing a window in which control flow violations may be identified and thus the attack may be detected, prior to launch of the malicious application.

Control flow integrity circuitry includes collector circuitry, decoder circuitry and control flow validator circuitry, as will be described in more detail below. The collector circuitry is configured to capture processor trace (PT) data from a PT driver that is configured to capture PT packets from the PT circuitry. The PT data may include a target instruction pointer (TIP) packet that includes a runtime target address of an indirect branch instruction of an executing target application. The decoder circuitry is configured to extract the TIP packet from the PT data and to decode the TIP packet to yield the runtime target address of the branch instruction. The control flow validator circuitry is configured to determine whether a control flow transfer to the runtime target address corresponds to a control flow violation based, at least in part, on a control flow graph (CFG).

As used herein, a runtime target address is a target address determined during runtime based, at least in part, on PT data. A static target address is a target address included in a CFG. Each static target address may have been determined by CFG generator circuitry during CFG generation operations and/or by PT circuitry prior to a current runtime, e.g., during preprocessing operations. Thus, the plurality of static target addresses may be determined over a plurality of runs of the target application during preprocessing operations. During control integrity validation operations, a static target address may be statically determined based, at least in part, on the CFG, i.e., may be retrieved from the CFG.

For example, the PT data may contain a first target instruction pointer (TIP) packet that includes a first runtime target address of an indirect branch instruction of an executing target application. The decoder circuitry may extract the first TIP packet from the PT data and decode the first TIP packet to yield the first runtime target address. The control flow validator circuitry may then determine whether a control flow transfer to the first runtime target address corresponds to a control flow violation based, at least in part, on a control flow graph (CFG). The CFG may include a plurality of nodes. Each node may include a start address of a first basic block, an end address of the first basic block and a next possible address of a second basic block or a not found tag.

In another example, the PT data may further include a second TIP packet that includes a second runtime target address. The first TIP packet and the second TIP packet may be sequential in the PT data. The decoder circuitry may be further configured to decode the second TIP packet to yield the second runtime target address. The determining whether the control flow transfer to the first runtime target address corresponds to a control flow violation may include determining whether a first static target address corresponds to the first runtime target address and whether a second static target address corresponds to the second runtime target address. The control flow validator circuitry may be further configured to determine whether a legitimate execution path exists in the CFG between the first static target address and the second static target address if the CFG includes the first static target address and the second static target address or to signal a control flow violation if the CFG does not include the first static target address or the second static target address.

Thus, control flow integrity circuitry may be configured to utilize PT data captured from PT circuitry and a CFG to determine whether a control flow violation exists in an executing target application, in real time.

FIG. 1 illustrates a functional block diagram of a system 100 that includes control flow integrity circuitry 102 consistent with several embodiments of the present disclosure. System 100 may further include a processor 110, a memory 112, a communication interface 114, an operating system (OS) 116, a target application 118 and a library 119. For example, processor 110 may correspond to a single core or a multi-core general purpose processor, such as those provided by Intel Corp., etc. In an embodiment, processor 110 may include processor trace (PT) circuitry 124, as will be described in more detail below. Communication interface 114 may be configured to couple system 100, wired and/or wirelessly, to one or more communication partners (not shown). Communication interface 114 may comply and/or be compatible with one or more communication protocols. For example, library 119 may correspond to a program library that includes one or more library functions configured to be utilized by target application 118. System 100 may include, but is not limited to, a mobile telephone including, but not limited to a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.) and/or system; an Internet of Things (IoT) networked device including, but not limited to, a sensor system (e.g., environmental, position, motion, etc.) and/or a sensor network (wired and/or wireless); a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc.

System 100 may further include control flow graph (CFG) generator circuitry 120, and a CFG store 122. In some embodiments, system 100 may include disassembler (DA) logic 121. DA logic 121 is configured to convert (i.e., disassemble) binary code to assembly code, i.e. assembly language instructions. CFG generator circuitry 120 is configured to generate an application CFG, e.g., application CFG 128, for target application 118 based, at least in part, on application assembly code. CFG generator circuitry 120 may be further configured to generate a library CFG, e.g., library CFG 129, for library 119 based, at least in part, on library binary code. Including library CFG 129 is configured to enhance control flow integrity validation operations. For example, CFG generator circuitry 120 is configured to generate a CFG for the target application binary code (i.e., executable code) and any library binary code used by the target application binary code. When an application executes, application instructions and associated library functions, etc., execute. In other words, during application execution, the control flow transfer may occur in the application as well as library instructions.

Thus, the CFG generator circuitry 120 is configured to generate control flow graphs for the application 118 and the libraries, e.g., library 119, used by the application 118. The CFGs 128, 129 may then be stored to CFG store 122. The CFGs (i.e., application CFG 128 and library CFG 129) may be generated via static analysis of the application binary code and library binary code. The CFGs 128, 129 may generally be generated in an off-line process. The indirect branch target addresses extracted from the static analysis of the binaries are with respect to the static beginning address of the binary code. At runtime, the application binary code and library binaries may be loaded to addresses that differ from the static beginning addresses used during the static analysis. Thus, runtime module (map) load information may be used to translate the runtime indirect branch target to the statically determined and stored indirect branch target address as Computed Target=runtime address−runtime module load address+static module beginning address. Thus, CFG generator circuitry 120 may be configured to generate each CFG based, at least in part, on target application 118 binary code and/or library 119 binary code.

CFG generator circuitry 120 is configured to receive assembly code from DA logic 121. DA logic 121 is configured to receive target application binary code and/or library binary code corresponding to target application 118 and/or library 119, respectively. DA logic 121 is further configured to convert, i.e., disassemble, the binary code into assembly language. For example, DA logic 121 may include, but is not limited to, IDA Pro and/or IDA Starter interactive disassemblers available from Hex-Rays, SA, Belgium. Of course, different and/or after-developed disassemblers are equally contemplated herein.

CFG generator circuitry 120 is configured to generate a CFG based, at least in part, on the assembly code corresponding to target application 118 and library 119. CFG generator circuitry 120 is configured to identify basic blocks and to identify connections between basic blocks based, at least in part, on assembly instructions, in order to generate the CFG. For example, one or more identifiable target addresses may be identified, statically. In another example, a set of possible identifiable target addresses may be determined for each indirect branch instruction that has associated identifiable but not uniquely identifiable target addresses. Thus, for each branch instruction, one identifiable target address may be identified, a set of identifiable target addresses may be identified or the branch instruction may be tagged with a not found tag, as described herein.

For example, a uniquely identifiable target address may correspond to a constant value. In another example, a not uniquely identifiable target address may correspond to an arithmetically computed value. The arithmetically computed value may be computed at runtime. In another example, an unidentifiable target address may include, but is not limited to, an arithmetically computed value, a library call, an exception handler, etc. A node that includes an indirect branch instruction with an unidentifiable target address may be tagged with, for example, a not found tag. The not found tag is configured to indicate to control flow validator circuitry 134 that a target address of the corresponding indirect branch instruction has not been identified. The control flow validator circuitry 134 may then be configured to implement a strict or a relaxed default policy. For example, the strict default policy may correspond to signaling a control flow violation for an unidentifiable target address and the relaxed default policy may correspond to allowing control flow transfer to any target address. The relaxed default policy may further include monitoring a return address to, e.g., detect an ROP attack.

In an embodiment, control flow validator circuitry 134 may be configured to perform static analysis of the binaries, e.g., target application 118 binary code and/or library 119 binary code. The static analysis may include identifying each basic block, identifying a respective start address of each basic block, identifying a respective end address of each basic block and identifying a next reachable basic block, if possible. The static analysis may further include, but is not limited to, monitoring propagation of constant values into processor registers, monitoring function calls and associated return instructions, monitoring switch and/or case instructions, monitoring C++ constructors and virtual table addresses, etc.

For example, a start address of the next reachable basic block may correspond to a target address of a last branch instruction of a current basic block. In another example, propagation of a constant value to a processor register and/or variables may be monitored. Control flow validator circuitry 134 may be further configured to determine whether each constant and/or variable is used as an operand address of an indirect branch instruction. Thus, one or more target addresses of indirect branch instructions, e.g., an indirect call and/or indirect jump may be identified. In another example, control flow validator circuitry 134 may be configured to monitor function calls. Control flow validator circuitry 134 may be further configured to update the next reachable target of the current basic block that ends with a return instruction from the function call. In another example, switch and/or case instructions may be monitored and a start of each case block may be identified. Thus, if an indirect jump instruction executes due to a switch and/or case, at least some of a set of possible targets of the indirect jump instruction may be identified. In another example, for target applications implemented in C++, a C++ constructor may be monitored to identify one or more virtual table addresses. Thus, one or more virtual function addresses may be identified and a set of possible target addresses may be identified (i.e., identifiable but not uniquely identifiable target addresses may be identified). In this manner, a size of the set of possible target addresses may be constrained and the constrained set may be utilized for control flow integrity validation operations related to a virtual function call.

System 100 may further include PT circuitry 124 and PT driver 126. PT circuitry 124 is an instruction trace tool, e.g., Intel processor trace available from Intel Corp., configured to capture PT data related to execution of, e.g., target application 118. The PT data may include a plurality of data packets that may include timing information and/or program flow information. PT data may include target instruction pointer (TIP) packets, TNT (taken/not taken) packets flow update packets (FUPs) and/or mode packets. FUPs are configured to provide source IP (instruction pointer)

addresses for asynchronous events, e.g., interrupts and exceptions, as well as other situations where a source address may not be determined from the binary code. TIP packets are configured to contain a TIP corresponding to a target address of indirect branch instructions, exceptions, interrupts and/or other branches or events. For example, a TIP packet may contain a runtime target address associated with indirect branch instruction, e.g., a return address (i.e., RET) associated with a function call instruction.

A TNT packet may be configured to track "direction" (e.g., taken or not taken) of a deterministic branch instruction. For example, a TNT packet may contain a TNT indicator (i.e., a bit) associated with the deterministic (i.e., direct) branch instruction. Deterministic branch instructions are branch instructions where the conditional target addresses are known prior to runtime. The branch selected is determined at run time based on a condition. Thus, the target address and the TNT indicator are sufficient to determine a legitimate target address of the deterministic branch instruction.

A TNT packet may be further utilized to provide a "compressed" return target indicator for an associated function call instruction. For example, the TNT indicator (e.g., the TNT indicator corresponding to "taken") included in the TNT packet may be utilized to indicate that a function call instruction return target corresponds to the instruction that follows the function call instruction. Thus, the TNT indicator may be utilized by control flow integrity circuitry 102 to determine whether a control flow violation exists.

PT driver 126 is configured to provide an interface between PT circuitry 124 and consumers of the PT data. For example, PT driver 126 may be configured to capture PT data, e.g., PT packets, from PT circuitry 124. PT driver 126 may configure trace operations of PT circuitry 124 via one or more commands from PT driver 126 to PT circuitry 124. For example, PT driver 126 may configure PT circuitry 124 to acquire only a portion of possible PT data packets, e.g., only TIP packets. Limiting acquisition to TIP packets is configured to reduce an overhead associated with acquiring PT data and may thus facilitate acquiring relatively more TIP packets, e.g., more often.

Control flow integrity (CFI) circuitry 102 includes collector circuitry 130, decoder circuitry 132, control flow validator circuitry 134 and policy store 136. CFI circuitry 102 is configured to monitor execution of target application 118 in order to detect a control flow violation, if any. In other words, CFI circuitry 102 is configured to determine whether a control flow transfer to a runtime target address determined based, at least in part, on PT data captured from PT circuitry 124, corresponds to a control flow violation. The determination may be further based, at least in part, on a control flow graph, e.g., CFG 128 and/or 129. CFI circuitry 102 is configured to perform the determination in real time, while an attacker a gadget is relatively benign and prior to launch of an associated malicious application.

In operation, prior to execution of target application 118, system 100 may be configured to perform preprocessing operations, e.g., static analysis. Preprocessing operations include generating, by CFG generator circuitry 120, an application CFG 128 corresponding to target application 118. Preprocessing operations may further include generating, by CFG generator circuitry 120, a library CFG 129 corresponding to library 119. For example, CFG generator circuitry 120 may be configured to utilize a static binary analysis technique to generate the CFGs 128, 129. The application CFG 128 and library CFG 129 may then be combined and stored to CFG store 122.

In some embodiments, PT circuitry 124 may be used to facilitate generation of CFG 128, 129. In these embodiments, at least a subset of possible identifiable target addresses may be determined for at least some of the indirect branch instructions with identifiable target addresses. For example, the CFG determined using static analysis, as described herein, may be enhanced with identifiable target addresses retrieved from captured PT data associated with a number of training runs of target application 118. In other words, each training run may correspond to a benign execution of the target application 118. As used herein, benign means not susceptible to attack. As used herein, dynamic analysis may correspond to utilizing PT circuitry 124 and training runs to identify possible target addresses that may then be utilized to update CFG 128, 129.

For example, CFI circuitry 102 may be configured to identify one or more possible identifiable target addresses. The possible identifiable target addresses may then be stored to the CFG 128 and/or 129. For example, during preprocessing operations, target application 118 may be launched and operations of PT circuitry 124 may be initiated. Collector circuitry 130 may then be configured to capture one or more PT packets from PT driver 126. The PT data may contain TIP packets that may then be extracted from the PT data by decoder circuitry 132. Decoder circuitry 132 may be further configured to decode each TIP packet to yield a corresponding runtime target address. Control flow validator circuitry 134 may then be configured to provide each runtime target address as a corresponding static target address to CFG 128 and/or 129. Control flow validator circuitry 134 may be further configured to associate each static target address with the corresponding branch instruction in the application CFG 128 and/or library CFG 129 stored to CFG store 122.

CFI circuitry 102 may be configured to repeat these operations a number of times. The static target addresses identified during these preprocessing operations may correspond to at least a subset of all identifiable possible target addresses an indirect branch instruction. A size of a fraction of all identifiable possible target addresses included in the subset may increase with a number of runs and/or with manipulation of the executing application, e.g., to trigger a variety of possible control flow paths. The identified static target addresses may then be used during normal operation. As used herein, normal operation means not training runs. In other words, during normal operation, target application 118 may be susceptible to attack.

Thus, the CFGs 128, 129 may be generated during preprocessing operations utilizing static and/or dynamic analysis. In one embodiment, at least a subset of identifiable possible target addresses may be identified during CFG generation by analyzing assembly instructions, i.e., static analysis. In another embodiment, at least a subset of identifiable possible target addresses may be identified during preprocessing operations utilizing PT circuitry 124 and CFI circuitry 102, i.e., dynamic analysis.

Thus, preprocessing operations may be performed that are configured to generate and/or enhance generated CFGs 128, 129 that may then be stored to CFG store 122. The preprocessing operations may include generating CFGs 128, 129 utilizing CFG generator circuitry 120. The preprocessing operations may further include disassembly of target application and/or library binary code by DA logic 121. In some embodiments, the preprocessing operations may include capturing PT data and decoding TIP packets to yield runtime target address(es). The runtime target address(es) may then be used to enhance CFGs 128, 129.

At the start of normal operation of system 100, target application 118 may be launched and PT circuitry 124 operations may be initiated. Collector circuitry 130 may then be configured to capture a PT packet (PT data) from PT driver 126. The PT data may contain a TIP packet that may then be extracted from the PT data by decoder circuitry 132. Decoder circuitry 132 may be further configured to decode each TIP packet to yield a corresponding runtime target address of an indirect branch instruction. Control flow validator circuitry 134 may then be configured to determine whether there is a control flow violation, i.e., whether a control flow transfer to the runtime target address corresponds to a control flow violation, based, at least in part, on a CFG, e.g., application CFG 128 and/or library CFG 129.

In one embodiment, decoder circuitry 132 may be configured to decode all packets included in PT data. Such packets may include, but are not limited to, TNT packets, TIP packets, FUPs and/or mode packets. TIP packets are configured to include indirect branch target IP addresses, as described herein. A source of the indirect branch may be determined by correlating PT data with CFG data. FUPs are configured to include a source IP address. For example, when a source address may not be identified, e.g., or asynchronous events such as interrupts, the source address may be reported in an FUP. In this embodiment, a source and destination of an indirect branch instruction may be identified, at a cost of increased decode overhead. A control flow path between (current source, current destination) and (last destination, current source) may be validated. Extracting (and decoding) all of the PT packets may allow reconstruction of an entire execution flow. PT data may facilitate identification of each branch instruction associated with the runtime target address and, thus, fine-grained control flow integrity validation.

In another embodiment, decoder circuitry 132 may be configured to decode TIP packets and/or TNT packets. Decoding only the TIP and/or TNT packets is configured to incur a relatively lower overhead compared to decoding all of the packets. In this embodiment, decoding the TIP packets corresponds to decoding only branch target addresses, i.e., runtime target addresses. Thus, in this embodiment, control flow validator circuitry 134 is configured to determine whether a legitimate control flow path exists (based, at least in part, on the CFG) between a last TIP target (i.e., a last runtime target address) in the current TIP target (i.e., a current runtime target address).

For example, utilizing PT data from PT circuitry 124, a last-found runtime target address and a current runtime target address may be identified. Control flow validator circuitry 134 may then be configured to utilize the runtime target addresses and the CFG 128, 129 to determine whether there is a legitimate control flow path between the two runtime target addresses.

For example, the PT data may contain a first target instruction pointer (TIP) packet that includes a first runtime target address of an indirect branch instruction of an executing target application. The decoder circuitry may extract the first TIP packet from the PT data and decode the first TIP packet to yield the first runtime target address. The control flow validator circuitry may then determine whether a control flow transfer to the first runtime target address corresponds to a control flow violation based, at least in part, on a control flow graph (CFG). The CFG may include a plurality of nodes. Each node may include a start address of a first basic block, an end address of the first basic block and a next possible address of a second basic block or a not found tag.

In another example, the PT data may further include a second TIP packet that includes a second runtime target address. The first TIP packet and the second TIP packet may be sequential in the PT data. The decoder circuitry may be further configured to decode the second TIP packet to yield the second runtime target address. The determining whether the control flow transfer to the first runtime target address corresponds to a control flow violation may include determining whether a first static target address corresponds to the first runtime target address and whether a second static target address corresponds to the second runtime target address. The control flow validator circuitry may be further configured to determine whether a legitimate execution path exists in the CFG between the first static target address and the second static target address if the CFG includes the first static target address and the second static target address or to signal a control flow violation if the CFG does not include the first static target address or the second static target address. For example, control flow validator circuitry 134 may be configured to notify, e.g., an administrator, of the control flow violation and may then halt the execution of target application 118. If a legitimate execution path exists in the CFG between the first static target address and the second static target address, then a control flow violation may not exist and operation of target application 118 may be allowed to continue.

In some situations, CFG 128 and/or 129 may not include a static target address corresponding to the branch instruction, rather CFG 128 and/or 129 may include a not found tag, as described herein. In such situations, operation of CFI circuitry 102 may be determined based, at least in part, on policy. Policy may be stored for example to policy store 136, e.g., as part of preprocessing operations. For example, policy may be strict so that execution of an indirect branch instruction without a legitimate static target address may result in a control flow violation. In this example, a control flow violation may be triggered whether or not a control flow violation actually exists. In other words, the strict policy may result in false positives. In another example, policy may be relaxed so that execution of an indirect branch instruction with a not found tag may not result in a control flow violation. In this example, while false positives may be avoided, control flow violations and, thus, malicious attacks that affect indirect branch targets, may not be detected.

In some embodiments, for example, for a relaxed policy, control flow validator circuitry 134 may be configured to monitor function call return addresses. In this example, the indirect branch instruction may correspond to a function call and the TIP packet may include a runtime return address (RET). Control flow validator circuitry 134 may be configured to retrieve a static return address from CFG 128 and/or 129 that corresponds to the function call. Similar to the determining whether the control flow transfer to the first runtime target address corresponds to a control flow violation, a runtime return address does not corresponds to a static return address, then a control flow violation may exist and control flow validator circuitry 134 may be configured to notify the control flow validation and halt the execution of target application 118.

In some embodiments, control flow validator circuitry 134 may be configured to determine whether a control flow violation exists based, at least in part, on the PT data itself. In this embodiment, the indirect branch instruction may correspond to a function call and the PT data may include a bit in a TNT packet in place of a TIP packet containing a return target address. If the PT data includes the TNT packet (i.e., compressed RET) and the TNT indicator, i.e., bit in the TNT packet that corresponds to the TIP packet, corresponds to taken, then a control flow violation may not exist. In other words, the TNT indicator corresponding to taken means that the PT circuitry has determined that the function call return address matched the next address following the address of the function call. Thus, the PT data may be utilized by control flow validator circuitry 134 to determine whether or not a control flow violation exists.

In an embodiment, collector circuitry 130 may be configured to command PT driver 126 to configure PT circuitry 124 to capture only TIP packets. Collector circuitry 130 may be further configured to command PT driver 126 to configure PT circuitry 124 to capture only selected TIP packets. For example, the selected TIP packets may correspond to target addresses associated with indirect calls and/or jumps, function returns and/or interrupts. In other words, PT circuitry 124 may capture a variety of PT data and corresponding PT packets, as described herein. Such operations of PT circuitry 124 may contribute to overhead associated with, e.g., processor 110, and may result in a performance penalty. Configuring PT circuitry 124 to selectively capture TIP packets may reduce the overhead and corresponding performance penalty. Reduced overhead and performance penalty may support capturing PT data relatively more often and made thus enhance control flow integrity operations.

Thus, processor trace (PT) data captured from PT circuitry and a control flow graph (CFG) may be utilized to determine whether a control flow violation exists in an executing target application, in real time. In other words, PT data captured from PT circuitry and a CFG may be utilized to determine whether a control flow transfer to a runtime target address corresponds to a control flow violation. The CFG may be determined prior to execution of the target application. The CFG may be generated based, at least in part, on PT data captured during preprocessing operations, as described herein. The control flow integrity violations may be detected in real time, prior to launch of a malicious application.

Figure 2:
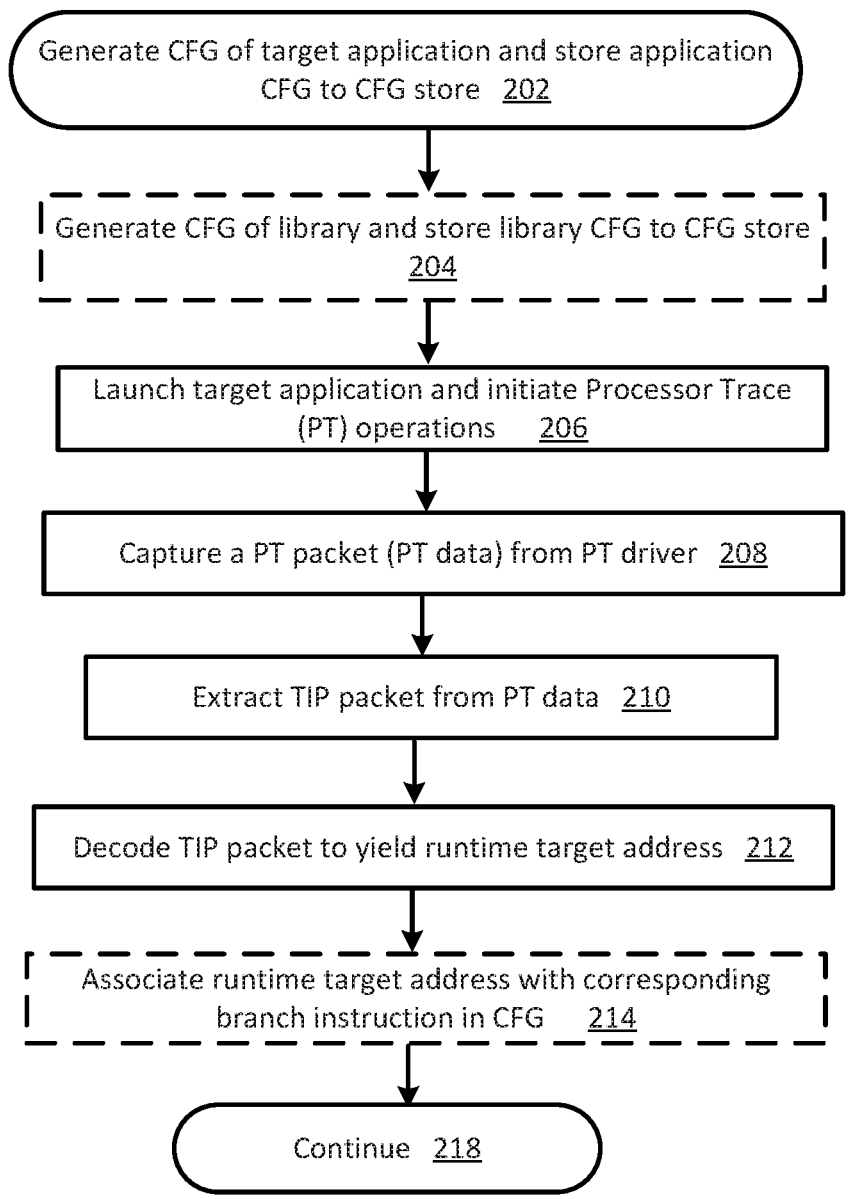
FIG. 2 is a flowchart of preprocessing operations according to various embodiments of the present disclosure.

FIG. 2 is a flowchart 200 of preprocessing operations according to various embodiments of the present disclosure. In particular, the flowchart 200 illustrates preprocessing operations configured to enhance accuracy of control flow violation detection. The operations may be performed, for example, by control flow integrity circuitry 102 (e.g., collector circuitry 130, decoder circuitry 132 and/or control flow validator circuitry 134), CFG generator circuitry 120, DA logic 121, PT circuitry 124 and/or PT driver 126 of FIG. 1.

Operations of this embodiment may begin with generating a control flow graph of a target application and storing an application CFG to CFG store at operation 202. In some embodiments, a CFG of a library may be generated and the library CFG stored to the CFG store at operation 204. The target application may be launched and processor trace (PT) operations may be initiated at operation 206. A PT packet (PT data) may be captured from the PT driver at operation 208. A TIP packet may be extracted from the PT data are at operation 210. The TIP packet may be decoded to yield a runtime target address at operation 212. In some embodiments, a static target address may be associated with a corresponding branch instruction in a control flow graph (CFG) at operation 214. For example, the static target address may correspond to a runtime target address, determined during preprocessing operations, as described herein. In some embodiments, operations 206 through 212 and operation 214 may be repeated a number of times. Program flow may continue at operation 218.

Thus, preprocessing operations may be performed configured to generate and/or enhance a CFG.

Figure 3:
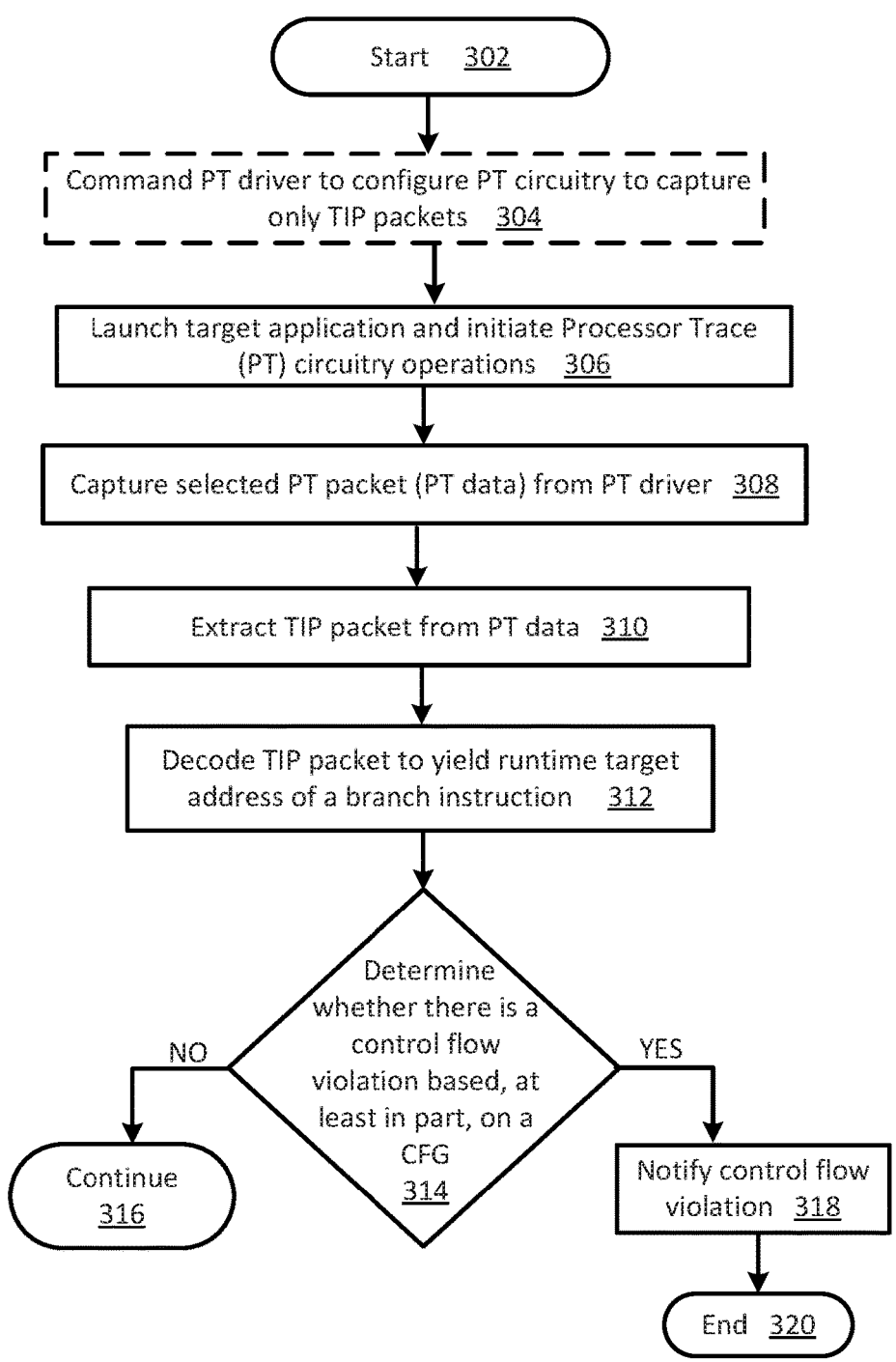
FIG. 3 is a flowchart of control flow integrity operations according to various embodiments of the present disclosure.

FIG. 3 is a flowchart 300 of control flow integrity operations according to various embodiments of the present disclosure. In particular, the flowchart 300 illustrates operations configured to identify control flow violations. The operations may be performed, for example, by control flow integrity circuitry 102, e.g., collector circuitry 130, decoder circuitry 132 and/or control flow validator circuitry 134, of FIG. 1.

Operations of this embodiment may begin with start 302. In some embodiments, a PT driver may be commanded to configure PT circuitry to capture only TIP packets at operation 304. A target application may be launched and PT circuitry operations may be initiated at operation 306. A PT packet (PT data) may be retrieved from the PT driver at operation 308. A TIP packet may be extracted from the PT data at operation 310. The TIP packet may be decoded to yield a runtime target address of a branch instruction at operation 312. Whether there is a control flow violation may be determined based, at least in part, on a control flow graph (CFG) at operation 314. For example, whether a control flow transfer to the runtime target address corresponds to a control flow violation, may be determined. If there is no control flow violation, then program flow may continue at operation 316. If there is a control flow violation, then the control flow violation may be notified at operation 318. Program flow may then end at operation 320.

Thus, a control flow violation may be identified based, at least in part, on PT data and based, at least in part, on a CFG.

While the flowcharts of FIGS. 2 and 3 illustrate operations according various embodiments, it is to be understood that not all of the operations depicted in FIGS. 2 and 3 are necessary for other embodiments. In addition, it is fully contemplated herein that in other embodiments of the present disclosure, the operations depicted in FIGS. 2 and/or 3 and/or other operations described herein may be combined in a manner not specifically shown in any of the drawings, and such embodiments may include less or more operations than are illustrated in FIGS. 2 and 3. Thus, claims directed to features and/or operations that are not exactly shown in one drawing are deemed within the scope and content of the present disclosure.

An apparatus, method and/or system are configured to utilize processor trace (PT) data captured from PT circuitry and a control flow graph (CFG) to determine whether a control flow transfer to a runtime target corresponds to a control flow violation in an executing target application, in real time. The CFG may be determined prior to execution of the target application. The CFG may be generated based, at least in part, on PT data captured during preprocessing operations, as described herein. The apparatus, method and/or system are configured to detect control flow integrity violations in real time, e.g., prior to launch of a malicious application.

As used in any embodiment herein, the term "logic" may refer to an app, software, firmware and/or circuitry configured to perform any of the aforementioned operations. Software may be embodied as a software package, code, instructions, instruction sets and/or data recorded on nontransitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor 110 executing code and/or instructions sets (e.g., software, firmware, etc.) corresponding to the functionality described herein, thus transforming a general-purpose processor into a specific-purpose processing environment to perform one or more of the operations described herein.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) may be configured to manage system resources and control tasks that are run on, e.g., system 100. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

Memory 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog-Unified Hardware Design, Specification, and Verification Language, dated Jul. 7, 2011; IEEE Std 1800™-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, means for performing acts of the method, a device, or of an apparatus or system related to control flow integrity, as discussed below.

Example 1

According to this example, there is provided an apparatus. The apparatus includes collector circuitry to capture processor trace (PT) data from a PT driver. The PT data includes a first target instruction pointer (TIP) packet including a first runtime target address of an indirect branch instruction of an executing target application. The apparatus further includes decoder circuitry to extract the first TIP packet from the PT data, to decode the first TIP packet to yield the first runtime target address. The apparatus further includes control flow validator circuitry to determine whether a control flow transfer to the first runtime target address corresponds to a control flow violation based, at least in part, on a control flow graph (CFG), the CFG including a plurality of nodes, each node including a start address of a first basic block, an end address of the first basic block and a next possible address of a second basic block or a not found tag.

Example 2

This example includes the elements of example 1, wherein the PT data further includes a second TIP packet including a second runtime target address, the first TIP packet and the second TIP packet sequential in the PT data, the decoder circuitry is further to decode the second TIP packet to yield the second runtime target address and the determining whether the control flow transfer to the first runtime target address corresponds to a control flow violation includes determining whether a first static target address corresponds to the first runtime target address and whether a second static target address corresponds to the second runtime target address.

Example 3

This example includes the elements of example 2, wherein the control flow validator circuitry is further to determine whether a legitimate execution path exists in the CFG between the first static target address and the second static target address if the CFG includes the first static target address and the second static target address or to signal a control flow violation if the CFG does not include the first static target address or the second static target address.

Example 4

This example includes the elements according to any one of examples 1 or 2, wherein at least one node includes a plurality of next possible addresses.

Example 5

This example includes the elements according to any one of examples 1 or 2, wherein at least one node includes a respective one possible address.

Example 6

This example includes the elements according to any one of examples 1 or 2, wherein the first runtime target address corresponds to a runtime return address and the determining whether the control flow transfer to the first runtime target address corresponds to a control flow violation includes determining whether the runtime return address corresponds to a static return address, the runtime return address and static return address associated with the indirect branch instruction.

Example 7

This example includes the elements according to any one of examples 1 or 2, wherein the collector circuitry is to command the PT driver to configure PT circuitry to limit PT data to TIP packets.

Example 8

This example includes the elements according to any one of examples 1 or 2, wherein the CFG includes a library CFG, the library associated with the target application.

Example 9

This example includes the elements according to any one of examples 1 or 2, wherein the determining whether the control flow transfer to the first runtime target address corresponds to a control flow violation includes determining whether the PT data includes a TNT (taken/not taken) packet associated with the indirect branch instruction.

Example 10

This example includes the elements according to any one of examples 1 or 2, wherein the control flow violation corresponds to detection of a control flow hijack attack.

Example 11

According to this example there is provided a control flow integrity method. The method includes capturing, by collector circuitry, processor trace (PT) data from a PT driver, the PT data including a first target instruction pointer (TIP) packet including a first runtime target address of an indirect branch instruction of an executing target application. The method further includes extracting, by decoder circuitry, the first TIP packet from the PT data and decoding, by the decoder circuitry, the first TIP packet to yield the first runtime target address. The method further includes determining, by control flow validator circuitry, whether a control flow transfer to the first runtime target address corresponds to a control flow violation based, at least in part, on a control flow graph (CFG), the CFG including a plurality of nodes, each node including a start address of a first basic block, an end address of the first basic block and a next possible address of a second basic block or a not found tag.

Example 12

This example includes the elements of example 11, wherein the PT data further includes a second TIP packet including a second runtime target address, the first TIP packet and the second TIP packet sequential in the PT data, further including, decoding, by the decoder circuitry, the second TIP packet to yield the second runtime target address and the determining whether the control flow transfer to the first runtime target address corresponds to a control flow violation includes determining whether a first static target address corresponds to the first runtime target address and whether a second static target address corresponds to the second runtime target address.

Example 13

This example includes the elements of example 12, and further includes determining, by the control flow validator circuitry, whether a legitimate execution path exists in the CFG between the first static target address and the second static target address if the CFG includes the first static target address and the second static target address or signaling, by the control flow validator circuitry, a control flow violation if the CFG does not include the first static target address or the second static target address.

Example 14

This example includes the elements according to any one of examples 11 or 12, wherein at least one node includes a plurality of next possible addresses.

Example 15

This example includes the elements according to any one of examples 11 or 12, wherein at least one node includes a respective one possible address.

Example 16

This example includes the elements according to any one of examples 11 or 12, wherein the first runtime target address corresponds to a runtime return address and determining whether the control flow transfer to the first runtime target address corresponds to a control flow violation includes determining whether the runtime return address corresponds to a static return address, the runtime return address and static return address associated with the indirect branch instruction.

Example 17

This example includes the elements according to any one of examples 11 or 12, and further includes commanding, by the collector circuitry, the PT driver to configure PT circuitry to limit PT data to TIP packets.

Example 18

This example includes the elements according to any one of examples 11 or 12, wherein the CFG includes a library CFG, the library associated with the target application.

Example 19

This example includes the elements according to any one of examples 11 or 12, wherein the determining whether the control flow transfer to the first runtime target address corresponds to a control flow violation includes determining whether the PT data includes a TNT (taken/not taken) packet associated with the indirect branch instruction.

Example 20

This example includes the elements according to any one of examples 11 or 12, wherein the control flow violation corresponds to detection of a control flow hijack attack.

Example 21

According to this example, there is provided a control flow integrity system. The system includes a processor, memory and a control flow graph (CFG). The CFG includes a plurality of nodes, each node including a start address of a first basic block, an end address of the first basic block and a next possible address of a second basic block or a not found tag. The system further includes collector circuitry to capture processor trace (PT) data from a PT driver, the PT data including a first target instruction pointer (TIP) packet including a first runtime target address of an indirect branch instruction of an executing target application. The system further includes decoder circuitry to extract the first TIP packet from the PT data and to decode the first TIP packet to yield the first runtime target address. The system further includes control flow validator circuitry to determine whether a control flow transfer to the first runtime target address corresponds to a control flow violation based, at least in part, on the CFG.

Example 22

This example includes the elements of example 21, wherein the PT data further includes a second TIP packet including a second runtime target address, the first TIP packet and the second TIP packet sequential in the PT data, the decoder circuitry is further to decode the second TIP packet to yield the second runtime target address and the determining whether the control flow transfer to the first runtime target address corresponds to a control flow violation includes determining whether a first static target address corresponds to the first runtime target address and whether a second static target address corresponds to the second runtime target address.

Example 23

This example includes the elements of example 22, wherein the control flow validator circuitry is further to determine whether a legitimate execution path exists in the CFG between the first static target address and the second static target address if the CFG includes the first static target address and the second static target address or to signal a control flow violation if the CFG does not include the first static target address or the second static target address.

Example 24

This example includes the elements according to any one of examples 21 or 22, wherein at least one node includes a plurality of next possible addresses.

Example 25

This example includes the elements according to any one of examples 21 or 22, wherein at least one node includes a respective one possible address.

Example 26

This example includes the elements according to any one of examples 21 or 22, wherein the first runtime target address corresponds to a runtime return address and the determining whether the control flow transfer to the first runtime target address corresponds to a control flow violation includes determining whether the runtime return address corresponds to a static return address, the runtime return address and static return address associated with the indirect branch instruction.

Example 27

This example includes the elements according to any one of examples 21 or 22, wherein the collector circuitry is to command the PT driver to configure PT circuitry to limit PT data to TIP packets.

Example 28

This example includes the elements according to any one of examples 21 or 22, wherein the CFG includes a library CFG, the library associated with the target application.

Example 29

This example includes the elements according to any one of examples 21 or 22, wherein the determining whether the control flow transfer to the first runtime target address corresponds to a control flow violation includes determining whether the PT data includes a TNT (taken/not taken) packet associated with the indirect branch instruction.

Example 30

This example includes the elements according to any one of examples 21 or 22, wherein the control flow violation corresponds to detection of a control flow hijack attack.

Example 31

According to this example, there is provided a computer readable storage device. The device has stored thereon instructions that when executed by one or more processors result in the following operations including: capturing processor trace (PT) data from a PT driver, the PT data including a first target instruction pointer (TIP) packet including a first runtime target address of an indirect branch instruction of an executing target application; extracting the first TIP packet from the PT data and decoding the first TIP packet to yield the first runtime target address; and determining whether a control flow transfer to the first runtime target address corresponds to a control flow violation based, at least in part, on a control flow graph (CFG), the CFG including a plurality of nodes, each node including a start address of a first basic block, an end address of the first basic block and a next possible address of a second basic block or a not found tag.

Example 32

This example includes the elements of example 31, wherein the PT data further includes a second TIP packet including a second runtime target address, the first TIP packet and the second TIP packet sequential in the PT data, wherein the instructions that when executed by one or more processors results in the following additional operations including, decoding the second TIP packet to yield the second runtime target address and the determining whether the control flow transfer to the first runtime target address corresponds to a control flow violation includes determining whether a first static target address corresponds to the first runtime target address and whether a second static target address corresponds to the second runtime target address.

Example 33

This example includes the elements of example 32, and wherein the instructions that when executed by one or more processors results in the following additional operations including determining whether a legitimate execution path exists in the CFG between the first static target address and the second static target address if the CFG includes the first static target address and the second static target address or signaling, by the control flow validator circuitry, a control flow violation if the CFG does not include the first static target address or the second static target address.

Example 34

This example includes the elements according to any one of examples 31 or 32, wherein at least one node includes a plurality of next possible addresses.

Example 35

This example includes the elements according to any one of examples 31 or 32, wherein at least one node includes a respective one possible address.

Example 36

This example includes the elements according to any one of examples 31 or 32, wherein the first runtime target address corresponds to a runtime return address and the determining whether the control flow transfer to the first runtime target address corresponds to a control flow violation includes determining whether the runtime return address corresponds to a static return address, the runtime return address and static return address associated with the indirect branch instruction.

Example 37

This example includes the elements according to any one of examples 31 or 32, and wherein the instructions that when executed by one or more processors results in the following additional operations including commanding, by the collector circuitry, the PT driver to configure PT circuitry to limit PT data to TIP packets.

Example 38

This example includes the elements according to any one of examples 31 or 32, wherein the CFG includes a library CFG, the library associated with the target application.

Example 39

This example includes the elements according to any one of examples 31 or 32, wherein the determining whether the control flow transfer to the first runtime target address corresponds to a control flow violation includes determining whether the PT data includes a TNT (taken/not taken) packet associated with the indirect branch instruction.

Example 40

This example includes the elements according to any one of examples 31 or 32, wherein the control flow violation corresponds to detection of a control flow hijack attack.

Example 41

According to this example, there is provided a device. The device includes means for capturing, by collector circuitry, processor trace (PT) data from a PT driver, the PT data including a first target instruction pointer (TIP) packet including a first runtime target address of an indirect branch instruction of an executing target application. The device further includes means for extracting, by decoder circuitry, the first TIP packet from the PT data and means for decoding, by the decoder circuitry, the first TIP packet to yield the first runtime target address. The device further includes means for determining, by control flow validator circuitry, whether a control flow transfer to the first runtime target address corresponds to a control flow violation based, at least in part, on a control flow graph (CFG), the CFG including a plurality of nodes, each node including a start address of a first basic block, an end address of the first basic block and a next possible address of a second basic block or a not found tag.

Example 42

This example includes the elements of example 41, wherein the PT data further includes a second TIP packet including a second runtime target address, the first TIP packet and the second TIP packet sequential in the PT data, further including means for decoding, by the decoder circuitry, the second TIP packet to yield the second runtime target address and the determining whether the control flow transfer to the first runtime target address corresponds to a control flow violation includes determining whether a first static target address corresponds to the first runtime target address and whether a second static target address corresponds to the second runtime target address.

Example 43

This example includes the elements of example 42, and further includes means for determining, by the control flow validator circuitry, whether a legitimate execution path exists in the CFG between the first static target address and the second static target address if the CFG includes the first static target address and the second static target address or signaling, by the control flow validator circuitry, a control flow violation if the CFG does not include the first static target address or the second static target address.

Example 44

This example includes the elements according to any one of examples 41 or 42, wherein at least one node includes a plurality of next possible addresses.

Example 45

This example includes the elements according to any one of examples 41 or 42, wherein at least one node includes a respective one possible address.

Example 46

This example includes the elements according to any one of examples 41 or 42, wherein the first runtime target address corresponds to a runtime return address and the determining whether the control flow transfer to the first runtime target address corresponds to a control flow violation includes determining whether the runtime return address corresponds to a static return address, the runtime return address and static return address associated with the indirect branch instruction.

Example 47

This example includes the elements according to any one of examples 41 or 42, and further includes means for commanding, by the collector circuitry, the PT driver to configure PT circuitry to limit PT data to TIP packets.

Example 48

This example includes the elements according to any one of examples 41 or 42, wherein the CFG includes a library CFG, the library associated with the target application.

Example 49

This example includes the elements according to any one of examples 41 or 42, wherein the determining whether the control flow transfer to the first runtime target address corresponds to a control flow violation includes determining whether the PT data includes a TNT (taken/not taken) packet associated with the indirect branch instruction.

Example 50

This example includes the elements according to any one of examples 41 or 42, wherein the control flow violation corresponds to detection of a control flow hijack attack.

Example 51

According to this example, there is provided a system. The system includes at least one device arranged to perform the control flow integrity method according to any one of examples 11 to 20.

Example 52

According to this example, there is provided a device. The device includes means to perform the control flow integrity method according to any one of examples 11 to 20.

Example 53

According to this example, there is provided a computer readable storage device. The device has stored thereon instructions that when executed by one or more processors result in the following operations including: the control flow integrity method according to any one of examples 11 through 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
   control flow graph (CFG) generator circuitry to generate a CFG for a target application, wherein the CFG comprises a plurality of nodes that each includes a start address of a first basic block, an end address of the first basic block, and a next possible address of a second basic block or a not found tag;
   collector circuitry to, during execution of the target application, capture processor trace (PT) data from a PT driver, the PT data comprising a first target instruction pointer (TIP) packet comprising a first runtime target address of an indirect branch instruction of the executing target application, and cause the PT driver to configure PT circuitry to limit collected PT data to TIP packets;
   decoder circuitry to extract the first TIP packet from the PT data and to decode the first TIP packet to yield the first runtime target address; and
   control flow validator circuitry to determine, based at least in part on the generated CFG, whether a control flow transfer to the first runtime target address corresponds to a control flow violation.

2. The apparatus of claim 1, wherein the PT data further comprises a second TIP packet comprising a second runtime target address, the first TIP packet and the second TIP packet sequential in the PT data, and wherein the decoder circuitry is further to decode the second TIP packet to yield the second runtime target address, and wherein determining whether the control flow transfer to the first runtime target address corresponds to a control flow violation comprises determining whether a first static target address corresponds to the first runtime target address and whether a second static target address corresponds to the second runtime target address.

3. The apparatus of claim 2, wherein the control flow validator circuitry is further to determine whether a legitimate execution path exists in the CFG between the first static target address and the second static target address if the CFG comprises the first static target address and the second static target address or to signal a control flow violation if the CFG does not comprise the first static target address or the second static target address.

4. The apparatus of claim 1, wherein at least one node of the CFG comprises a plurality of next possible addresses.

5. The apparatus of claim 1, wherein the first runtime target address corresponds to a runtime return address and wherein determining whether the control flow transfer to the first runtime target address corresponds to a control flow violation comprises determining whether the runtime return address corresponds to a static return address, the runtime return address and static return address being associated with the indirect branch instruction.

6. The apparatus of claim 1, wherein the CFG comprises a library CFG corresponding to a library associated with the target application.

7. The apparatus of claim 1, wherein determining whether the control flow transfer to the first runtime target address corresponds to a control flow violation comprises determining whether the PT data comprises a TNT (taken/not taken) packet associated with the indirect branch instruction.

8. A control flow integrity system comprising:
a processor;
memory;
control flow graph (CFG) circuitry to generate a CFG comprising a plurality of nodes, each node comprising a start address of a first basic block, an end address of the first basic block and a next possible address of a second basic block or a not found tag;
collector circuitry to capture processor trace (PT) data from a PT driver, the PT data comprising a first target instruction pointer (TIP) packet comprising a first runtime target address of an indirect branch instruction of an executing target application, and to command the PT driver to configure PT circuitry to limit PT data to TIP packets;
decoder circuitry to extract the first TIP packet from the PT data, to decode the first TIP packet to yield the first runtime target address; and
control flow validator circuitry to determine whether a control flow transfer to the first runtime target address corresponds to a control flow violation based, at least in part, on the CFG.

9. The control flow integrity system of claim 8, wherein the PT data further comprises a second TIP packet comprising a second runtime target address, the first TIP packet and the second TIP packet being sequential in the PT data, wherein the decoder circuitry is further to decode the second TIP packet to yield the second runtime target address, and wherein determining whether the control flow transfer to the first runtime target address corresponds to a control flow violation comprises determining whether a first static target address corresponds to the first runtime target address and whether a second static target address corresponds to the second runtime target address.

10. The control flow integrity system of claim 9, wherein the control flow validator circuitry is further to determine whether a legitimate execution path exists in the CFG between the first static target address and the second static target address if the CFG comprises the first static target address and the second static target address or to signal a control flow violation if the CFG does not comprise the first static target address or the second static target address.

11. The control flow integrity system of claim 8, wherein at least one node comprises a plurality of next possible addresses.

12. The control flow integrity system of claim 8, wherein the first runtime target address corresponds to a runtime return address and wherein determining whether the control flow transfer to the first runtime target address corresponds to a control flow violation comprises determining whether the runtime return address corresponds to a static return address, the runtime return address and static return address associated with the indirect branch instruction.

13. The control flow integrity system of claim 8, wherein to generate the CFG includes to generate a library CFG corresponding to a library associated with the target application.

14. The control flow integrity system of claim 8, wherein determining whether the control flow transfer to the first runtime target address corresponds to a control flow violation comprises determining whether the PT data comprises a TNT (taken/not taken) packet associated with the indirect branch instruction.

15. A computer readable storage device having stored thereon instructions that when executed by one or more processors result in the following operations comprising:
generating a control flow graph (CFG) for a target application, the CFG comprising a plurality of nodes that each comprises a start address of a first basic block, an end address of the first basic block and a next possible address of a second basic block or a not found tag;
capturing processor trace (PT) data from a PT driver, the PT data comprising a first target instruction pointer (TIP) packet comprising a first runtime target address of an indirect branch instruction of the executing target application, and causing the PT driver to configure PT circuitry to limit PT data to TIP packets;
extracting the first TIP packet from the PT data;
decoding the first TIP packet to yield the first runtime target address; and
determining, based at least in part on the generated CFG for the target application, whether a control flow transfer to the first runtime target address corresponds to a control flow violation.

16. The device of claim 15, wherein the PT data further comprises a second TIP packet comprising a second runtime target address, the first TIP packet and the second TIP packet sequential in the PT data, wherein the instructions that when executed by one or more processors further result in decoding the second TIP packet to yield the second runtime target address, and wherein determining whether the control flow transfer to the first runtime target address corresponds to a control flow violation comprises determining whether a first static target address corresponds to the first runtime target address and whether a second static target address corresponds to the second runtime target address.

17. The device of claim 16, wherein the instructions that when executed by one or more processors further result in determining whether a legitimate execution path exists in the CFG between the first static target address and the second static target address if the CFG comprises the first static target address and the second static target address, or signaling a control flow violation if the CFG does not comprise the first static target address or the second static target address.

18. The device of claim 15, wherein at least one node comprises a plurality of next possible addresses.

19. The device of claim 15, wherein the first runtime target address corresponds to a runtime return address and wherein determining whether the control flow transfer to the first runtime target address corresponds to a control flow violation comprises determining whether the runtime return address corresponds to a static return address, the runtime return address and static return address being associated with the indirect branch instruction.

20. The device of claim 15, wherein generating the CFG includes generating a library CFG corresponding to a library associated with the target application.

21. The device of claim 15, wherein determining whether the control flow transfer to the first runtime target address corresponds to a control flow violation comprises determining whether the PT data comprises a TNT (taken/not taken) packet associated with the indirect branch instruction.

* * * * *